United States Patent
Van Der Kruijs

(10) Patent No.: US 10,822,356 B2
(45) Date of Patent: Nov. 3, 2020

(54) PROCESS TO PREPARE ALUMINOXANES

(71) Applicant: NOURYON CHEMICALS INTERNATIONAL, B.V., Arnhem (NL)

(72) Inventor: Peter Van Der Kruijs, Deventer (NL)

(73) Assignee: NOURYON CHEMICALS INTERNATIONAL, B.V., Arnhem (NL)

( * ) Notice: Subject to any disclaimer, the term of this patent is extended or adjusted under 35 U.S.C. 154(b) by 0 days.

(21) Appl. No.: 16/092,037

(22) PCT Filed: May 19, 2017

(86) PCT No.: PCT/EP2017/062055
§ 371 (c)(1),
(2) Date: Oct. 8, 2018

(87) PCT Pub. No.: WO2017/202701
PCT Pub. Date: Nov. 30, 2017

(65) Prior Publication Data
US 2019/0119307 A1    Apr. 25, 2019

(30) Foreign Application Priority Data
May 24, 2016 (EP) .................... 16171007

(51) Int. Cl.
*C07F 5/06* (2006.01)

(52) U.S. Cl.
CPC .............. *C07F 5/068* (2013.01); *C07F 5/066* (2013.01)

(58) Field of Classification Search
CPC .................... C07F 5/066; C07F 5/068
See application file for complete search history.

(56) References Cited

U.S. PATENT DOCUMENTS

| 5,663,394 A | 9/1997 | Roberg et al. |
| 5,728,855 A | 3/1998 | Smith et al. |
| 10,323,047 B2 * | 6/2019 | Bergsma .................. C07F 5/068 |
| 2011/0282017 A1 | 11/2011 | Kaji et al. |
| 2015/0376306 A1 | 12/2015 | Tsurugi et al. |
| 2018/0134731 A1 * | 5/2018 | Bergsma .................. C07F 5/068 |

FOREIGN PATENT DOCUMENTS

| CN | 102239187 A | 11/2011 |
| JP | H03271295 A | 12/1991 |
| JP | H0449293 A | 2/1992 |
| WO | 2014123212 A1 | 8/2014 |
| WO | 2015/062977 A1 | 5/2015 |
| WO | WO2015062977 * | 5/2015 |
| WO | 2016170017 A1 | 10/2016 |

OTHER PUBLICATIONS

Nagendrappa, "Organic Synthesis under Solvent-free Condition. AN Environmentally Benign Procedure—I." Resonance 2002, 59-68. (Year: 2002).*
Anna Maria Caporusso et al.; "Metal Catalysis in Organic Reactions"; Journal of Organic Chemistry, vol. 47, 1982, pp. 4640-4644; American Chemical Society 1982.
European Search Report issued in the counterpart European Application No. 16171007.4 dated Oct. 31, 2016.
Notification of Transmittal of the International Search Report and the Written Opinion of the International Searching Authority, or the Declaration from the International Bureau of WIPO for International Application No. PCT/EP2017/062055 dated Aug. 7, 2017.

* cited by examiner

*Primary Examiner* — Clinton A Brooks
(74) *Attorney, Agent, or Firm* — Lorenz & Kopf, LLP

(57) ABSTRACT

Process to prepare alkylaminoxane by reacting, in the absence of solvent, 1 molar equivalent of alkylaluminium with 0.1 to 0.8 molar equivalent of a substituted allylic alcohol of the formula (I) wherein R1 and R2 are independently selected from aliphatic and aromatic hydrocarbon groups, and each R3, R4, and R5 is independently selected from aliphatic and aromatic hydrocarbon groups and a hydrogen atom.

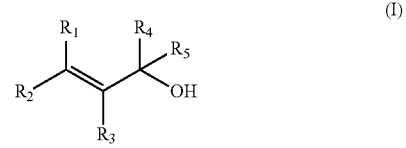

(I)

20 Claims, No Drawings

PROCESS TO PREPARE ALUMINOXANES

This application is a national stage filing under 35 U.S.C. § 371 of PCT/EP2017/062055, filed May 19, 2017, which claims priority to European Patent Application No. 16171007.4 filed May 24, 2016, the contents of which are each incorporated herein by reference in their entireties.

The present invention relates to the preparation of aluminoxanes. Aluminoxanes are known in the industry, mainly by their application as co-catalyst in metallocene catalysts that are used in polymerizing or oligomerizing olefins.

Aluminoxanes (also called alumoxanes) may be linear, cyclic, oligomeric or polymeric structures wherein two or more aluminium atoms are linked via an oxygen bridge. For example, they have structures like $R(-Al(-R)-O)_n-Al-R_2$), wherein n is an integer, each R can independently be an alkyl or alkoxy group, and optionally two or more of the R groups may be linked together to give the indicated cyclic structures, i.e., two R groups can be an oxygen bridge between two aluminium atoms. When at least part of the R groups are methyl groups, the aluminoxane is called a methylaluminoxane (MAO).

U.S. Pat. No. 5,663,394 discloses a process to prepare methylaluminoxanes. The process involves the reaction of trimethylaluminium with water in an organic solvent. Because of the uncontrollable reactivity of trimethylaluminium with water, the water reactant can only be underdosed and the reaction initially gives low conversion, which can only be increased by recycling steps.

At the same time, the reaction between water and trimethylaluminium (TMAL) leads to the formation of aluminium salt precipitates (like aluminium hydroxide and aluminium oxides) and gel formation. These problems increase when TMAL and $H_2O$ are dosed closer to equimolar ratio.

If this reaction between trimethylaluminium and water is performed in the absence of organic solvent, a violent reaction occurs, resulting in a solidified reaction mixture. In other words: this reaction cannot be performed in the absence of organic solvent.

WO 2015/062977 discloses a process for preparing methylaluminoxanes by reacting alkylaluminium with a substituted allylic alcohol instead of water. This reaction is performed in an inert organic solvent. In the Examples, toluene is used as the solvent.

The reaction disclosed in this document is gentle and better controlled than with water, which means that the allylic alcohol can be dosed in higher molar ratio than water. The process gives improved yield and a lower amount of side products.

The disadvantage of this process, however, is that the solvent may become substituted with the substituted allylic alcohol, leading to impurities and loss of conversion. Another disadvantage is that the presence in the end product of aromatic solvents, like toluene, is undesired in several applications of the product, especially for applications that require food contact approval.

It is therefore an object of the present invention to provide a process for the preparation of methyl aluminoxane products that is more generic in terms of end-use, and can be combined with any solvent, depending on the end use application.

This object has been met by the process of the present invention, which performs the reaction between alkyl aluminium and substituted allylic alcohol in the absence of solvent. This allows the resulting methyl aluminoxane to be dissolved in any organic solvent, if any.

That the reaction can be successfully performed in the absence of solvent is surprising, because, as explained above, the reaction between alkyl aluminium and water cannot be performed in the absence of organic solvent. And the same holds for the reaction between alkyl aluminium and acetic acid. That solvent is not required in the reaction between alkyl aluminium and allylic alcohol is therefore contrary to expectation.

The present invention therefore relates to a process for preparing alkylaluminoxane by reacting, in the absence of solvent, 1 molar equivalent of alkylaluminium with 0.1 to 0.8 molar equivalent of a substituted allylic alcohol of the formula

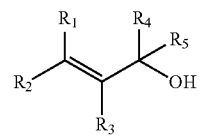

wherein R1 and R2 are independently selected from aliphatic and aromatic hydrocarbon groups, and R3, R4, and R5 are independently selected from aliphatic and aromatic hydrocarbon groups and a hydrogen atom.

In a preferred embodiment, the substituted allylic alcohol is of the formula

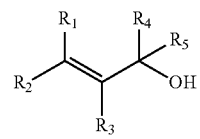

wherein R1 and R2 are independently selected from branched and linear alkyl or alkylene groups, more preferably alkyl and alkylene groups of up to 20 carbon atoms, and R3, R4, and R5 are independently selected from hydrogen and the same alkyl or alkylene group as selected for R1 and/or R2.

More preferred are substituted allylic alcohols wherein R4 and R5 are hydrogen groups.

Even more preferred substituted allylic alcohols are 3-methyl-2-pentene-1-ol, 4-methyl-3-pentene-2-ol, 3-methyl-2-hexene-1-ol, 3-ethyl-2-pentene-1-ol, (trans)-3,7-dimethyl-2,6-octadien-1-ol (geraniol), and 3-methyl-2-butene-1-ol (prenol). Most preferred is prenol.

It has also been found that this solvent-free process can be conducted using methacrylic acid or a conjugated unsaturated carbonyl-functional compound instead of the allylic alcohol.

The invention therefore also relates to a process to prepare alkylaluminoxane by reacting, in the absence of solvent, alkyl aluminium with methacrylic acid or a conjugated unsaturated carbonyl-functional compound of the formula

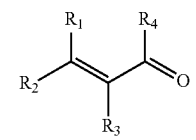

wherein R1 and R2 are independently selected from aliphatic hydrocarbon groups (preferably an alkyl or alkylene group of up to 20 carbon atoms), R3 is an aliphatic hydrocarbon group (preferably a branched or linear aliphatic alkyl or alkylene group of up to 20 carbon atoms) or a hydrogen atom, and R4 is an aliphatic hydrocarbon group (preferably a branched or linear aliphatic alkyl or alkylene group of up to 20 carbon atoms), a hydrogen atom, or a hydroxyl group, in a ratio of 0.1-0.8, preferably 0.5-0.8, and most preferably 0.6-0.75 molar equivalent oxygen atoms in the part —C=O(R4) of the methacrylic acid or conjugated unsaturated carbonyl-functional compound per molar equivalent of aluminium atoms in the alkylaluminium.

This ratio implies that when a carboxylic acid is used—which requires R4 to contain an oxygen atom—the molar ratio of conjugated unsaturated carbonyl-functional compound per molar equivalent of alkylaluminium is between 0.05 and 0.4, preferably between 0.25 and 0.4, and more preferably between 0.3 and 0.375 molar equivalent.

Preferred conjugated unsaturated carbonyl-functional compounds are 3-methyl-2-butenoic acid, 2-methyl-2-propenoic acid, 4-methyl-3-pentene-2-one, and 3-methyl-2-butenal.

The alkylaluminoxane obtained by the above processes can be used as a component in catalysts used for olefin polymerization or oligomerization processes, such as processes to prepare polyethylene, polypropylene, or rubbers. The catalyst in which aluminoxane is a component can be a homogeneous or heterogeneous catalyst, with or without a support or carrier.

In a preferred embodiment, the alkylaluminium is a trialkylaluminium wherein the alkyl substituents are alkyl groups of up to 8 carbon atoms, more preferably isobutyl, ethyl, or methyl. Even more preferred alkylaluminium compounds are compounds wherein at least 50%, even more preferably at least 80% of the alkyl groups are methyl. Most preferably, the trialkylaluminium is trimethylaluminium (TMAL).

In the process of the present invention using substituted allylic alcohol, the ratio of the reactants is 0.1 to 0.8 mole of substituted allylic alcohol per mole of alkylaluminium. Preferably, this ratio is between 0.5 and 0.8 mole, more preferably between 0.6 and 0.75 mole of substituted allylic alcohol per mole of alkylaluminium.

In one embodiment, the process may contain a first step using a molar ratio of substituted allylic alcohol to alkylaluminium of between 0.9:1 and 1:0.9, followed by a second step in which additional alkylaluminium is added, thereby resulting in an overall molar ratio of alcohol on aluminium of between 0.6 and 0.75.

In yet another preferred embodiment, the process is operated in the presence of aluminoxane, optionally in a continuous or semi-continuous mode. Even more preferably, the process involves first preparing an alkoxide addition product of the substituted allylic alcohol (or the methacrylic acid or conjugated unsaturated carbonyl-functional compound) and the alkyl aluminium and (semi-continuously or continuously) adding or dosing this adduct to—previously formed—aluminoxane. Or vice versa, although adding or dosing aluminoxane to the adduct is less preferred because it may then be harder to control the reaction. Since aluminoxane may catalyse the reaction towards (more) aluminoxane, this way of performing the process of the invention is very favourable. Performing the reaction this way also ensures that the exothermic nature of the reaction can be better controlled.

As the skilled person will be aware, suitable reaction temperatures during the process are dependent on the choice of starting materials. They are suitably between 0° C. and reflux temperature, in a preferred embodiment between 0° C. and 100° C., more preferably between 0° C. and 80° C., even more preferably between 10° C. and 50° C., and most preferably between 20° C. and 40° C.

However, when a carrier is present, the reaction mixture is preferably heated to a temperature above 80° C., even more preferably above 90° C. The temperature preferably is less than 200° C.

Examples of carriers include (porous) inorganic and organic support materials. The aluminoxane may be adsorbed or absorbed therein or thereon. Non-limiting examples of suitable supports include compounds comprising Groups 2, 3, 4, 5, 13, and 14 oxides and chlorides. Suitable supports may include, for example, silica, magnesia, titania, zirconia, montmorillonite, phyllosilicate, alumina, silica-alumina, silica-chromium, silica-titania, magnesium chloride, graphite, magnesia, titania, zirconia, and the like. Combinations of supports may also be suitable, including, for example, silica-chromium, silica-alumina, silica-titania, and the like. Fumed or calcined silica is a preferred support.

The support may possess an average particle size in the range of from about 0.1 μm to about 90 μm, preferably from about 1 μm to about 40 μm, more preferably from about 5 μm to about 40 μm The support, such as an inorganic oxide, preferably has a BET surface area in the range 10-700 $m^2/g$, more preferably 50-500 $m^2/g$, and most preferably 100-400 $m^2/g$. The pore volume of the support is preferably 0.1-4.0 ml/g, more preferably 0.5-3.5 ml/g, and most preferably 0.8-3.0 ml/g. The average particle size of the support is preferably in the range 1-500 μm, more preferably 10-200 μm, and most preferably 5-100 μm. The average pore size of the support is preferably in the range 1-5000 Å, more preferably 10-1000 Å, even more preferably 50-500 Å, and most preferably 75-350 Å.

If so desired, the resulting aluminoxane may be diluted with an organic solvent, preferably an aliphatic solvent, most preferably hexane or heptane.

EXAMPLES

Example 1

A 50 ml glass vial was charged with 7 g (97.2 mmol) TMAL (ex-AkzoNobel). 3-Methyl-2-buten-1-ol (prenol, ex-Sigma Aldrich) was dosed at a rate of 0.1 ml/min.

After 69 minutes, when 5.86 g (6.91 ml, 68.1 mmol, 0.7 eqv.) prenol had been dosed, the dosing was stopped. The reaction mixture was slowly dosed to a 30 ml vial containing 1 g of polymethylaluminoxane (PMAO), while keeping the reaction temperature between 40° C. and 60° C.

The reaction resulted in the formation of PMAO, as confirmed by $^1$H-NMR

To a 2 gram sample of the formed PMAO, 1.18 g methylcyclohexane was added, which resulted in a clear slightly yellow solution.

To another 2 gram sample, 1.2 g 1-octene was added, which resulted in a clear slightly yellow solution.

To a further 2 gram sample, 1.19 g toluene was added, which resulted in a clear slightly yellow solution.

Example 2

A 30 ml glass vial was charged with 3.5 g (48.6 mmol) TMAL (ex-AkzoNobel). 3-Methyl-2-buten-1-ol (prenol, ex-Sigma Aldrich) was dosed at a rate of 0.1 ml/min.

After 33.5 minutes, when 2.86 g (3.36 ml, 33.0 mmol, 0.68 eqv.) prenol had been dosed, the dosing was stopped. The reaction mixture was slowly dosed to a 30 ml vial containing 1 g of polymethylalyminoxane (PMAO), while keeping the reaction temperature between 40° C. and 60° C.

The formation of PMAO was confirmed by 1H-NMR

Example 3

A 20 ml vial with a magnetic stir bar was charged with 3.5 g (48.6 mmol) TMAL (ex-AkzoNobel).

Mesityloxide (4-methylpent-3-en-2-one, ex-Sigma Aldrich; 3.30 g; 33.6 mmol; 0.69 eqv.) was then dosed over a period of 47 minutes. The reaction temperature was kept below 50° C. A clear and slightly viscous intermediate reaction mixture was obtained.

1 g of the prepared intermediate reaction mixture was charged to a 20 ml vial equipped with a magnetic stir bar. The vial was placed in a heating block and heated to 100° C. After about 8 minutes of heating at 100° C., a violent uncontrollable exothermic reaction occurred. All the liquid present in the reaction mixture was boiled off leaving a foamy substance in the vial.

In order to better control the exothermic reaction, a new 20 ml vial equipped with a magnetic stir bar was charged with 0.3 g of the prepared intermediate reaction mixture. The reaction mixture was diluted with 0.7 g TMAL and heated to 100° C. After 13 minutes, an exothermic, but controllable reaction occurred. Over a period of about 30 minutes, the remaining intermediate reaction mixture was dosed to the 20 ml vial. The reaction was exothermic and the reaction temperature was kept between 80 and 90° C. A clear, bright red, and slightly viscous liquid was obtained. The liquid solidified upon storage at −20° C.

The formation of PMAO was confirmed by $^1$H-NMR.

Example 4

To a 20 ml vial with a magnetic stir bar were charged 3.5 g (48.6 mmol) TMAL (ex-Akzo Nobel).

Within 72 minutes, 1.01 g (17 mmol, 0.35 eqv. (O/Al=0.7)) acetic acid was dosed to the TMAL, while keeping to temperature below 50° C.

The reaction was violent and a dark brown reaction mixture was obtained. The reaction mixture contained some light brown solids.

A sample was taken and filtrated over a PTFE Millipore® filter. $^1$H-NMR showed no PMAO formation.

Next, the reaction mixture was heated to 100° C. No exothermic reaction was observed.

After 22 hours of heating a dark brown, partially solidified gel was obtained.

The reaction product only partially dissolved in THF.

The formation of PMAO was confirmed by $^1$H-NMR.

Example 5

A 20 ml vial was charged with 3.5 g (48.6 mmol) TMAL.

Water was slowly dosed to the TMAL using a 100 μL syringe with a capillary needle.

The reaction was very violent and solids were formed. Due to the vigorousness of the reaction, it was decided to stop the dosing of the water.

The invention claimed is:

1. Process for preparing alkylaluminoxane by reacting, in the absence of solvent, 1 molar equivalent of alkylaluminium with 0.1 to 0.8 molar equivalent of a substituted allylic alcohol of the formula

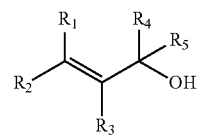

wherein R1 and R2 are independently selected from aliphatic and aromatic hydrocarbon groups, and R3, R4, and R5 are independently selected from aliphatic and aromatic hydrocarbon groups and a hydrogen atom.

2. Process according to claim 1 wherein between 0.5 and 0.8 molar equivalent of substituted allylic alcohol is used per molar equivalent of alkylaluminium.

3. Process according to claim 2 wherein R1 and R2 are independently selected from branched and linear alkyl or alkylene groups of up to 20 carbon atoms, and wherein R3, R4, and R5 are independently selected from branched and linear alkyl and alkylene groups of up to 20 carbon atoms and a hydrogen atom.

4. Process according to claim 3 wherein the substituted allylic alcohol is selected from the group consisting of 4-methyl-3-pentene-2-ol, 3-methyl-2-pentene-1-ol, 3-methyl-2-hexene-1-ol, 3-ethyl-2-pentene-1-ol, (trans)-3,7-dimethyl-2,6-octadien-1-ol, and 3-methyl-2-butene-1-ol.

5. Process according to claim 1 wherein R1 and R2 are independently selected from branched and linear alkyl or alkylene groups of up to 20 carbon atoms, and wherein R3, R4, and R5 are independently selected from branched and linear alkyl and alkylene groups of up to 20 carbon atoms and a hydrogen atom.

6. Process according to claim 5 wherein the substituted allylic alcohol is selected from the group consisting of 4-methyl-3-pentene-2-ol, 3-methyl-2-pentene-1-ol, 3-methyl-2-hexene-1-ol, 3-ethyl-2-pentene-1-ol, (trans)-3,7-dimethyl-2,6-octadien-1-ol, and 3-methyl-2-butene-1-ol.

7. Process according to claim 1 wherein between 0.6 and 0.75 molar equivalent of substituted allylic alcohol is used per molar equivalent of alkylaluminium.

8. Process according to claim 1 wherein between 0.6 and 0.75 molar equivalent of substituted allylic alcohol is used per molar equivalent of alkylaluminium and wherein R1 and R2 are independently selected from branched and linear alkyl or alkylene groups of up to 20 carbon atoms, and wherein R3, R4, and R5 are independently selected from branched and linear alkyl and alkylene groups of up to 20 carbon atoms and a hydrogen atom.

9. Process according to claim 8 wherein the substituted allylic alcohol is selected from the group consisting of 4-methyl-3-pentene-2-ol, 3-methyl-2-pentene-1-ol, 3-methyl-2-hexene-1-ol, 3-ethyl-2-pentene-1-ol, (trans)-3,7-dimethyl-2,6-octadien-1-ol, and 3-methyl-2-butene-1-ol.

10. Process for preparing alkylaluminoxane by reacting, in the absence of solvent, 1 molar equivalent of alkylaluminium with 0.6 to 0.75 molar equivalent of a substituted allylic alcohol selected from the group consisting of 4-methyl-3-pentene-2-ol, 3-methyl-2-pentene-1-ol, 3-methyl-2-hexene-1-ol, 3-ethyl-2-pentene-1-ol, (trans)-3,7-dimethyl-2,6-octadien-1-ol, and 3-methyl-2-butene-1-ol.

11. Process for preparing alkylaluminoxane by reacting, in the absence of solvent, alkyl aluminium with methacrylic acid or a conjugated unsaturated carbonyl-functional compound of the formula

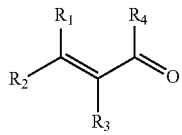

wherein R1 and R2 are independently selected from aliphatic hydrocarbon groups, R3 is an aliphatic hydrocarbon group or a hydrogen atom, and R4 is an aliphatic hydrocarbon group, a hydrogen atom, or a hydroxyl group in a ratio of 0.1 to 0.8 molar equivalent oxygen atoms in the part —C=O(R4) of the methacrylic acid or conjugated unsaturated carbonyl-functional compound per molar equivalent of aluminium atoms in the alkylaluminium.

12. Process according to claim 11 wherein R1 and R2 are independently selected from branched and linear aliphatic alkyl and alkylene groups of up to 20 carbon atoms, R3 is a branched or linear aliphatic alkyl or alkylene group of up to 20 carbon atoms or a hydrogen atom, and R4 is a branched or linear aliphatic alkyl or alkylene group of up to 20 carbon atoms, a hydrogen atom, or a hydroxyl group.

13. Process according to claim 12 wherein methacrylic acid or one of the conjugated unsaturated carbonyl-functional compounds is selected from the group consisting of 3-methyl-2-butenoic acid, 2-methyl-2-propenoic acid, 4-methyl-3-pentene-2-one, 3-methyl-2-butenal.

14. Process according to claim 11 wherein methacrylic acid or one of the conjugated unsaturated carbonyl-functional compounds is selected from the group consisting of 3-methyl-2-butenoic acid, 2-methyl-2-propenoic acid, 4-methyl-3-pentene-2-one, 3-methyl-2-butenal.

15. Process according to claim 11 wherein the alkylaluminium is a trialkylaluminium wherein the alkyl groups are alkyl groups of up to 8 carbon atoms.

16. Process of claim 15 wherein one or more of the alkyl groups on the alkylaluminium are isobutyl, ethyl or methyl.

17. Process according to claim 15 wherein the alkylaluminium is a compound wherein at least 50% of the alkyl groups are methyl.

18. Process according to claim 17 wherein the alkylaluminium contains trimethylaluminium.

19. Process according to claim 18, wherein the obtained aluminoxane is subsequently dissolved in an aliphatic solvent.

20. Process according to claim 19 wherein the aliphatic solvent is hexane or heptane.

* * * * *